United States Patent [19]

DeLange

[11] Patent Number: 5,187,419

[45] Date of Patent: Feb. 16, 1993

[54] ELECTRIC MOTOR CONTROL APPARATUS AND METHOD

[75] Inventor: Robert J. DeLange, St. Francis, Wis.

[73] Assignee: Allen-Bradley Company, Inc., Milwaukee, Wis.

[21] Appl. No.: 695,870

[22] Filed: May 6, 1991

[51] Int. Cl.$^5$ .............................................. H02F 7/00
[52] U.S. Cl. ..................................... 318/805; 318/254
[58] Field of Search ........ 318/254, 138, 439, 799–812, 318/727, 362, 368, 369

[56] References Cited

U.S. PATENT DOCUMENTS

| | | | |
|---|---|---|---|
| 4,712,050 | 12/1987 | Nagasawa et al. | 318/254 |
| 4,743,815 | 5/1988 | Gee et al. | 318/254 |
| 4,862,052 | 8/1989 | Unsworth et al. | 318/757 |
| 4,912,378 | 3/1990 | Vukosavic | 318/254 |
| 4,978,897 | 12/1990 | Merrison et al. | 318/268 |
| 4,983,894 | 1/1991 | Oku et al. | 318/138 |
| 4,996,470 | 2/1991 | Rowan et al. | 318/772 |
| 5,003,241 | 3/1991 | Rowan et al. | 318/761 |

Primary Examiner—A. Jonathan Wysocki
Attorney, Agent, or Firm—Quarles & Brady

[57] ABSTRACT

An electric induction motor is connected by a switch means to a source of three-phase alternating electricity. The speed of the motor is determined by detecting when the source voltage a zero crossing and thereafter sensing the polarity of the back emf voltage induced in each winding of the motor when the switch means is non-conductive. After several zero crossings a set of polarity samples has been produced from each winding. The motor speed is determined by detected the occurrence of a predefined relationship among samples in each set. For example, the speed is in the range of fifty to about thirty-eight percent of full synchronous speed when three consecutive samples from one winding all have the same polarity. The occurrence of the predefined relationship among back emf polarity samples can be used to control the braking of the motor.

16 Claims, 7 Drawing Sheets

ELECTRIC MOTOR CONTROL APPARATUS AND METHOD

BACKGROUND OF THE INVENTION

The present invention relates to techniques for detecting the speed of an electric motor; and particularly to techniques which utilize the back emf of the motor to determine the speed.

Solid state controllers, such as those described in U.S. Pat. Nos. 4,996,470 and 4,978,887, have been developed to regulate the speed of an alternating current induction motor. These devices provide braking mechanism to decelerate the motor to stop in a controlled manner. The braking systems used in both the aforementioned patents have different modes of operation with a change from one mode to another occurring when the motor speed has reduced below a predefined level. Thus these controllers require a mechanism to measure the motor speed.

The controller described in U.S. Pat. No. 4,996,470 initially uses dynamic braking to slow the motor to a point at which cycle skipping can be applied to bring the motor and the device driven by it to an accurate stop. The dynamic braking mode involves sensing the polarity of the supply line voltage and the voltage induced by back electromotive force (emf) in the motor. When these polarities are opposite to each other, the supply line current is applied to the motor until the next zero current crossing occurs. This process repeatedly sends current pulses through the motor which produce a negative torque that slows its speed.

The dynamic braking has been used to reduce the speed of a motor to a point where cycle skipping can be employed to drive the motor at a slower speed. Cycle skipping is a power switching technique that generates a specific pattern of positive and negative pulses which applies current to the motor at an effective sub-harmonic frequency of the supply line frequency. The application of this pattern of current causes the motor to operate at a reduced speed. However, if the motor speed has not been reduced sufficiently when cycle skipping begins, the motor will remain synchronized to the supply line frequency component present in the pulse pattern and return to the previous higher speed. As a consequence, this braking technique requires a fairly accurate determination of motor speed in order to determine when the transition to cycle skipping can occur.

Previously the period between dynamic braking current pulses was used as an indicator of motor speed. The shorter the period between these pulses, the lower the motor speed. Although this speed determining technique can be used satisfactorily in many applications, in certain situations the characteristics of the motor and the driven load are such that the use of the pulse period causes a transition to cycle skipping too early and the motor returns to high speed. Therefore in these applications an additional mechanism must be provided to determine when the motor speed has been reduced to a point at which cycle skipping can be used effectively.

Other motor control techniques also require speed sensing and often employ tachometers or other electromechanical devices to produce an electrical signal indicative of motor speed. Many present day motor controllers incorporate a microprocessor, making it desirable to use the computational ability of that component to determine motor speed, rather than adding an electromechanical speed detection device.

SUMMARY OF THE INVENTION

A system for controlling the speed of an three-phase induction electric motor includes three bidirectional switches each coupling a phase from an electric source to one of three motor windings. A mechanism senses the polarity of back emf voltage induced in each winding of the motor and produce a plurality of polarity samples for each winding during every half-cycle of the electricity from the source. A detector determines when a predefined relationship exists among the plurality samples from at least one winding, that occurs when the speed of the motor is within a defined range.

In one application of this speed detection, the occurrence of the predefined relationship controls the application of electricity to brake the motor. A braking mechanism responds to the control signal by controlling said three bidirectional thyristor switch to apply a first sequence of current pulses to the motor when the speed is greater than the defined range and a second sequence of current pulses when the speed has entered the defined range. The application of pulses reduces the speed of the motor from its full synchronous speed.

An object of the present invention is to provide a system for detecting the speed of the electric motor without using electromechanical sensors.

Another object is to utilize the back emf induced in the motor windings when the switch means are in a non-conductive state as an indicator of the motor speed.

A further object of the present invention is to provide a technique for braking the speed of the motor in a controlled manner, and changing to different braking modes in response to the sensed speed.

DETAILED DESCRIPTION OF THE INVENTION

Figure 1:
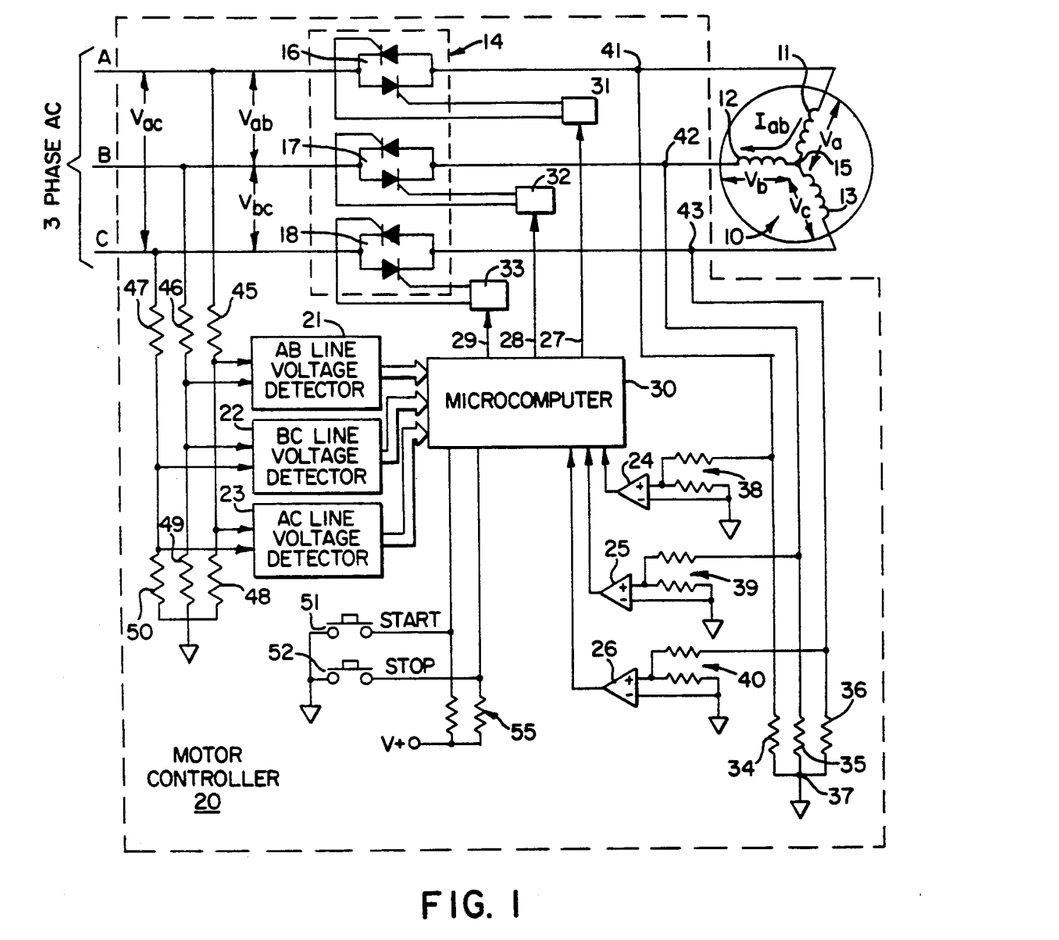
FIG. 1 is a schematic diagram illustrating an electric motor and a motor controller for practicing the present invention.

With initial reference to FIG. 1, a three-phase electric motor 10 has a trio of stator windings 11, 12 and 13. The application of electricity to the induction motor 10 is regulated by a motor controller 20 and its thyristor switch module 14. The switch module 14 includes three pairs of SCR's 16, 17 and 18 with the SCR's in each pair connected in an inverse-parallel relationship. Each SCR pair couples one of the stator windings 11, 12 or 13 to a supply line A, B, or C from a source of three-phase alternating electricity. The voltage across each pair combination of the supply lines has a frequency of fifty or sixty Hertz.

The SCR pairs 16–18 are triggered, or fired, by a control circuit that includes a microcomputer 30, three line voltage detectors 21, 22, and 23, and a trio of voltage comparators 24, 25, and 26. The microcomputer 30 may be a model 6801 sold by Hitachi America, Ltd. and containing a microprocessor, timer circuits, a read only memory, and a random access memory in the same integrated circuit package. A computer program which defines the operation of the motor controller 20 is stored in the microcomputer's read only memory. This program is similar to those used with conventional programmable motor controllers insofar as the functions of starting and operating the motor 10 at a normal running speed. As will be explained in detail, the program contains a novel routine for stopping the motor 10 and detecting motor speed.

The microcomputer 30 generates properly timed thyristor trigger signals on three lines 27, 28 and 29 of a parallel output port. The first output line 27 is coupled by a first isolation transformer 31 to the gate terminals of the first pair of SCR's 16 for electricity supply line A. The other trigger signal output lines 27 and 28 are coupled by similar isolation transformers 32 and 33 to the gate terminals of the second and third SCR pairs 17 and 18, respectively, for electricity supply lines B and C.

Three terminals 41, 42, and 43 couple the stator windings 11, 12 and 13 to the motor controller 20. Three equal value resistors 34–36 are coupled to these terminals 41–43 in a wye connection with the common node 37 of the wye connected to the ground of the controller circuit. The voltage across each resistor 34, 35, and 36 equals the voltage Va, Vb, and Vc across the three stator windings 11, 12, and 13, respectively. The potential at the common node 37 of the wye resistor connection is the same as the neutral node 15 of the motor windings, which typically is equal to the neutral potential of the electricity source.

A first voltage comparator 24 senses the voltage Va across the first stator winding 11. Specifically, the non-inverting input of this voltage comparator 24 is coupled to the first stator winding terminal 41 by a voltage divider 38 which reduces the stator winding voltage to a level compatible with the voltage comparator. The inverting input of voltage comparator 24 is connected directly to the circuit ground and its output is connected to a parallel input port line of the microcomputer 30. The first voltage comparator 24 is employed to produce an output which indicates the polarity of the voltage (Va) induced across the first motor wincing 11 by the back electromotive force (emf). The back emf results from the rotating magnetic field within the motor produced by the magnetism of the rotor. As will be described, the polarity of the back emf induced voltage is sensed by the microcomputer 30 when electricity from the supply lines is not being applied to the motor. The polarity of this voltage is sensed with respect to the neutral node.

The second voltage comparator 25 is coupled by another voltage divider 39 to the second motor terminal 42 to similarly sense the polarity of the voltage Vb across the second stator winding 12. The third voltage comparator 25 is coupled by yet another voltage divider 40 to the third motor terminal 43 to sense the polarity of the voltage Vc across the third stator winding 13. The outputs of the second and third voltage comparators 25 and 26 are connected to other lines of the microcomputer parallel input port to provide indications of the back emf voltage polarities across the second and third stator windings.

The A, B, and C supply lines are coupled by separate resistors 45, 46, and 47 to the inputs of the three line voltage detectors 21, 22 and 23. Three additional resistors 48, 49 and 50 couple the inputs of the line voltage detectors to the controller circuit ground, thereby forming voltage dividers with resistors 45–47. The first line voltage detector is connected to resistors 45 and 46 to sense when the voltage Vab across supply lines A and B goes through zero and sense the polarity of voltage Vab with respect to the neutral potential. Indications of both these sensed parameters are applied to inputs of the microcomputer 30. Second line voltage detector 22 is connected to the resistors 46 and 47 to sense the zero crossing and polarity of the voltage Vbc across supply lines B and C; while the third detector 23 senses those parameters of the voltage Vac across supply lines A and C. Each of the line voltage detectors 21–23 provides an indication as to whether a detected zero voltage crossing is a negative to positive (rising) transition or a positive to negative (falling) transition.

Alternatively, the number of line voltage detectors 21–23 can be reduced and the computing capability of the microcomputer 30 used to determine the zero crossing times and supply voltage polarities. For example, only two line voltage detectors need be provided. Upon power up, the microcomputer detects the occurrence of zero crossings and voltage polarity in the two phases associated with the line voltage detectors. From the order of the crossings, the interval between them and the polarities of the two voltage waveforms, the microcomputer 30 determines the phase relationships and frequency of the supply voltages. This information is used the initialize a set of flags within the microcomputer memory that are toggled thereafter by internal timers to represent the polarity and zero crossing of the three supply line voltages. Periodically the zero crossing signal from one of the line voltage detectors is sensed to insure that the flags remain synchronized to the alternating supply line voltages. The complexity of the line voltage detectors 21–23 car be reduced by sensing the phase voltages (the voltage of a supply line to neutral) rather than the voltage across pairs of the supply lines. The microcomputer 30 can infer the voltages across the supply lines from the phase voltages. These alternatives may be preferable to the illustrated circuit, as they reduce the required hardware and circuit complexity.

Additional input port lines of the microcomputer 30 are connected to a pair of manual pushbutton switches 51 and 52. These input port lines are also coupled by a pair of pull-up resistors 55 to the positive voltage supply for the motor controller 20. Activation of one of these switches 51–52 pulls the associated microcomputer input line to ground. The first pushbutton switch 51 is activated by an operator to start the motor 10 and signals the microcomputer 30 to begin executing a conventional software routine for starting and controlling the normal running of the motor 10. The second pushbutton switch 52 is activated by the operator to stop the motor 10 and causes the microcomputer 30 to execute a software routine to brake the motor 10, as will be described. Alternatively, the start and brake input signals can originate from a programmable logic controller or other control circuit, instead of the pushbuttons 51 and 52.

Figure 2:
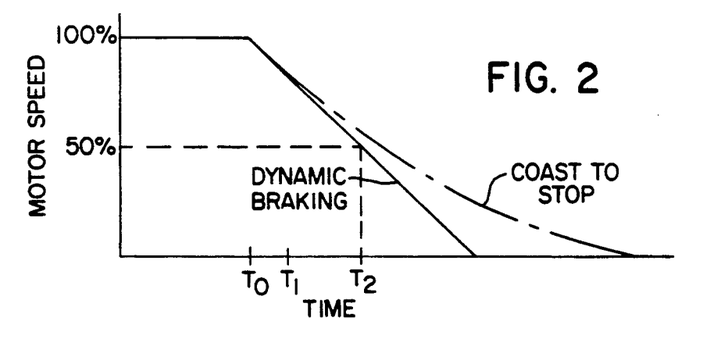
FIG. 2 is a graph of motor speed versus time for a dynamic braking technique used by the motor controller.

When the motor 10 is being braked, the controller 20 terminates conventional triggering of the SCR pairs 16-18 and begins dynamic motor braking. The polarity of the back emf voltage induced in at least one of the stator windings 11-13 is sensed along with the polarity of the voltage across at least one pair of the supply lines A, B or C. When these voltage polarities are opposite to each other, i.e. one positive and the other negative, two pairs of SCR's are triggered into a conductive state during one half cycle of the alternating supply line current. This action applies a pulse of current through the associated stator windings to produce a magnetic field which generates negative torque in the motor. The speed of the motor 10 increases due to the negative torque at a faster rate than merely allowing the motor to coast to a stop, as graphically shown in FIG. 2. After the speed has been reduced by at least fifty percent as occurs at time $T_2$, the SCR's are continued to be triggered during the same half of every current cycle regardless of the voltage polarity relationship, until the motor stops. This stopping technique is referred to as "full dynamic braking" and is described in U.S. Pat. No. 4,833,386, which is incorporated herein by reference.

Figure 3:
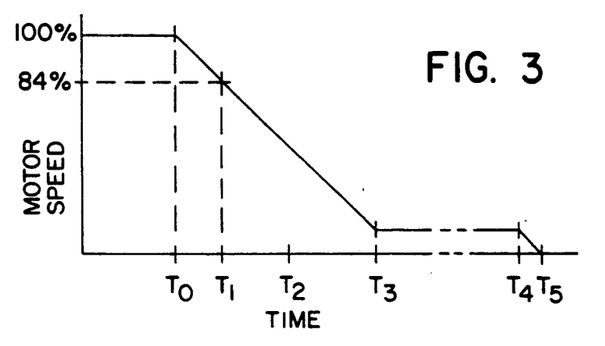
FIG. 3 is a graph of motor speed versus time for a cycle skipping stopping technique used by the motor controller.

In situations where the motor stopping must be controlled to accurately position an object that is driven by the motor, dynamic braking is used initially to reduce the speed to eighty-four percent of the full synchronous speed at the supply line frequency (50 or 60 Hz). Thereafter cycle skipping is used to drive the motor at a relatively slow speed until the object is near its desired position, at which time (T4) the SCR's are triggered during every other half-cycle of the supply line current to rapidly slow the motor as shown in FIG. 3. During the cycle skipping phase, the pairs of SCR's are triggered in a pattern and at times to apply current to the motor at a lower effective frequency than the line current frequency, as described in U.S. Pat. No. 4,996,470 which also is incorporated herein by reference. The software stored in the microcomputer 30 determines which technique a particular motor controller uses in the second phase of stopping.

This speed reduction and stoppage of the electric motor are carried out by the motor controller 20 executing a software braking routine depicted by the flowcharts in FIGS. 4-8. At time $T_0$, an operator closes pushbutton 52 producing a signal to which the microcomputer 30 responds by calling the motor speed reduction routine. This execution of this routine commences at step 70 on FIG. 4. with the microcomputer 30 initializing the variables and counters which will be used in executing the routine. Then, at step 72, the output from the AB line voltage detector 21 is examined to determine if the voltage Vab across supply lines A and B has made a zero crossing. If a zero crossing has not occurred, the program execution waits at step 72. Eventually, a zero voltage crossing is detected, causing a flag to be set within the microcomputer memory to indicate whether the zero crossing is rising or falling, that is whether the voltage Vab is now negative or positive.

Figure 4:
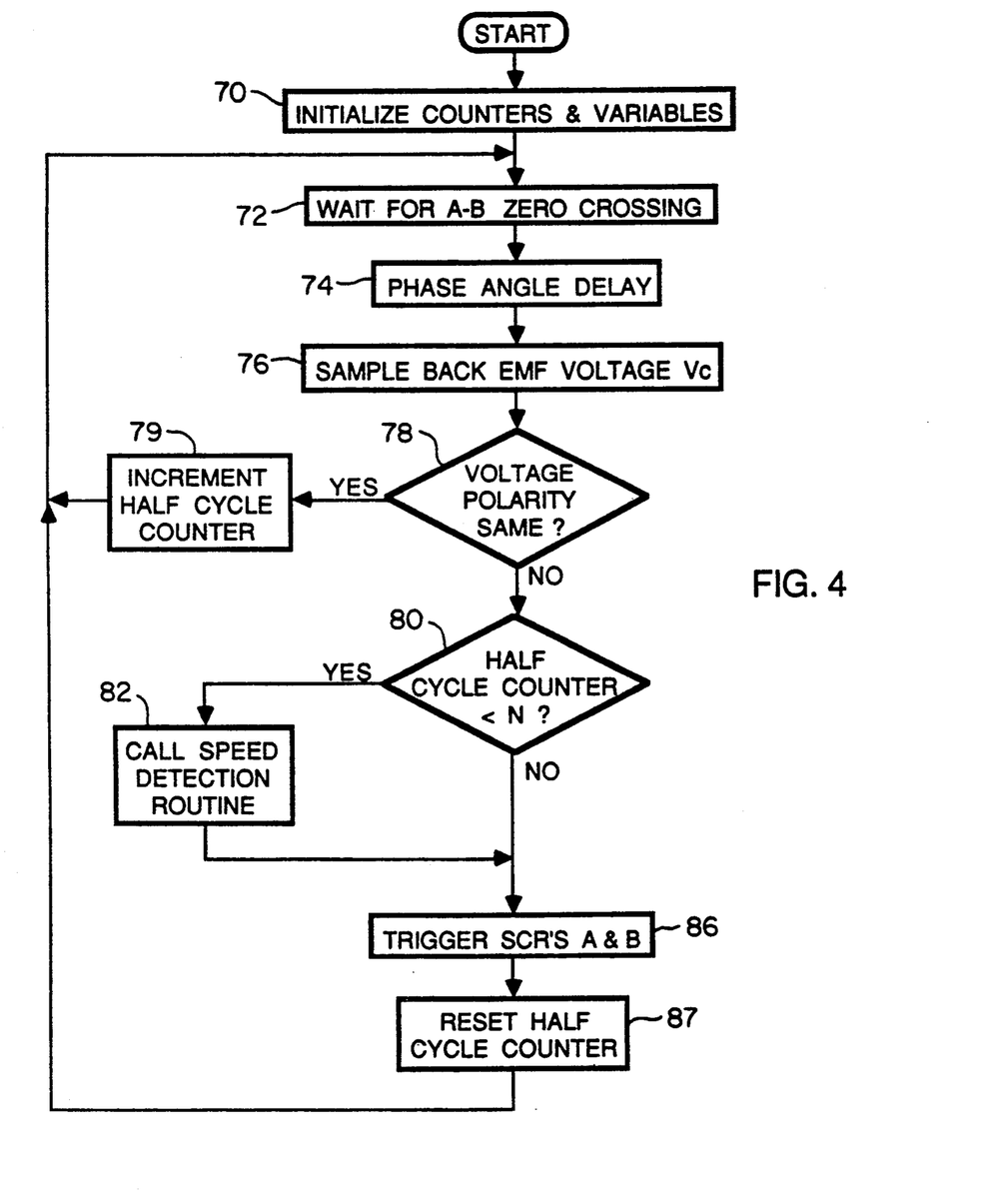
FIG. 4 is a flowchart of a software routine of one mode of dynamic motor braking.

The program execution then advances to step 74 at which, the microcomputer 30 waits for a given amount of time to provide a conventional phase angle delay before triggering the appropriate SCR's within the switch module 14. In determining the triggering time, a delay interval is added to the present value of the microcomputer's timer. The program execution does not advance from step 74 until it is time to fire the SCR's, when the value of the microcomputer's timer will equal the result of the addition.

At this point, the microcomputer 30 samples the polarity of the back emf voltage Vc across the third winding 13 of the motor 10. The sampling is accomplished by sensing the output of the third voltage comparator 26 and storing the output in a memory location within the microcomputer 30 at step 76. Then, the polarity of the sampled back emf voltage is compared to the polarity of the supply line voltage Vab at step 78. If the two voltage polarities are the same, i.e. they are both either positive or negative as referenced to the neutral potential, the program execution branches to step 79 where the microcomputer increments the contents of a counter address in its memory. This address location stores a count of the half-cycles of the supply line voltage, which occur between firings of the SCR's during the dynamic braking mode. The program execution then returns to step 72 to await another zero crossing of voltage Vab.

When the polarity of the supply line voltage Vab and the polarity of the back emf voltage across the third winding 13 are opposite in polarity, SCR pairs 16 and 17 are triggered to apply a current Iab through motor windings 11 and 12 to produce a negative torque. When this occurs, the contents of the half-cycle counter storage location are examined at step 80 to determine if it is less than a given number N, the value of which depends upon the type of braking technique used, as will be described. During the initial phase of the motor speed reduction (between times $T_0$ and $T_1$ on FIGS. 2 and 3) the half-cycle count always will be greater than the number N and the execution will advance directly to step 86.

At this juncture, the microcomputer 30 produces output signals on lines 27 and 28 to trigger SCR pairs 16 and 17 for supply lines A and B. This triggering of the SCR's sends current Iab through stator windings 11 and 12 which generates a magnetic field that is opposed to the magnetic field of the rotor of motor 10. The opposing magnetic fields produce a reduction in the speed of the motor. Then at step 87 the microcomputer resets the half-cycle counter to zero before the program execution returns to step 72 to await another zero crossing of the line voltage.

During this initial phase of the motor speed reduction, the current applied by the triggering of the SCR pairs 16 and 17 will produce current pulses at intervals that are longer than five cycles of the supply line voltage Vab. As a result, the value of the half-cycle counter just prior to SCR triggering will be eleven or more. As the motor speed slows, the interval between when the supply line voltage and the back emf voltage are opposite will decrease and the SCR's will be triggered more frequently.

Consider first a motor controller 20 that uses full dynamic braking to slow the motor, in which case the value of N for step 80 is set to two. Eventually, the SCR's will be triggered during every other half cycle of the supply line voltage Vab and the half-cycle counter will have a value of one upon examination at step 80. This typically occurs when the motor has slowed by approximately fifty percent, but for some motors this condition may occur at higher speeds. For these latter motors the dynamic braking thyristor firing pattern alone can not be relied upon as an indicator of motor speed. Therefore, when the half cycle count examined at step 80 and the SCR's are being triggered every cycle, the microcomputer 30 calls a speed detection subroutine at step 82. The speed detection subroutine for full dynamic braking is depicted by the flow chart of FIG. 5, commences at step 88 with the microcomputer 30 incrementing a sample count in its memory. The value of the sample count is designated X and is used to identify each of three sets of voltage polarity samples (AX, BX and CX). The first time that this subroutine is executed the sample count will be incremented to one. Then at step 89, the microcomputer reads the outputs of the three voltage comparators 24–26 to obtain a first set of polarity samples of the back emf voltage induced in each stator winding 11–13, with the first trio of samples being designated A1, B1 and C1. The sample count is inspected to determine if three sets of back emf voltage polarity samples have been taken, at step 90. If not, the program execution branches to steps 91 and 92 to wait for the next zero crossing of voltage Vab and then the phase angle delay. Once these events have occurred another set of back emf voltage samples are taken from the three stator windings 11–13.

Figure 5:
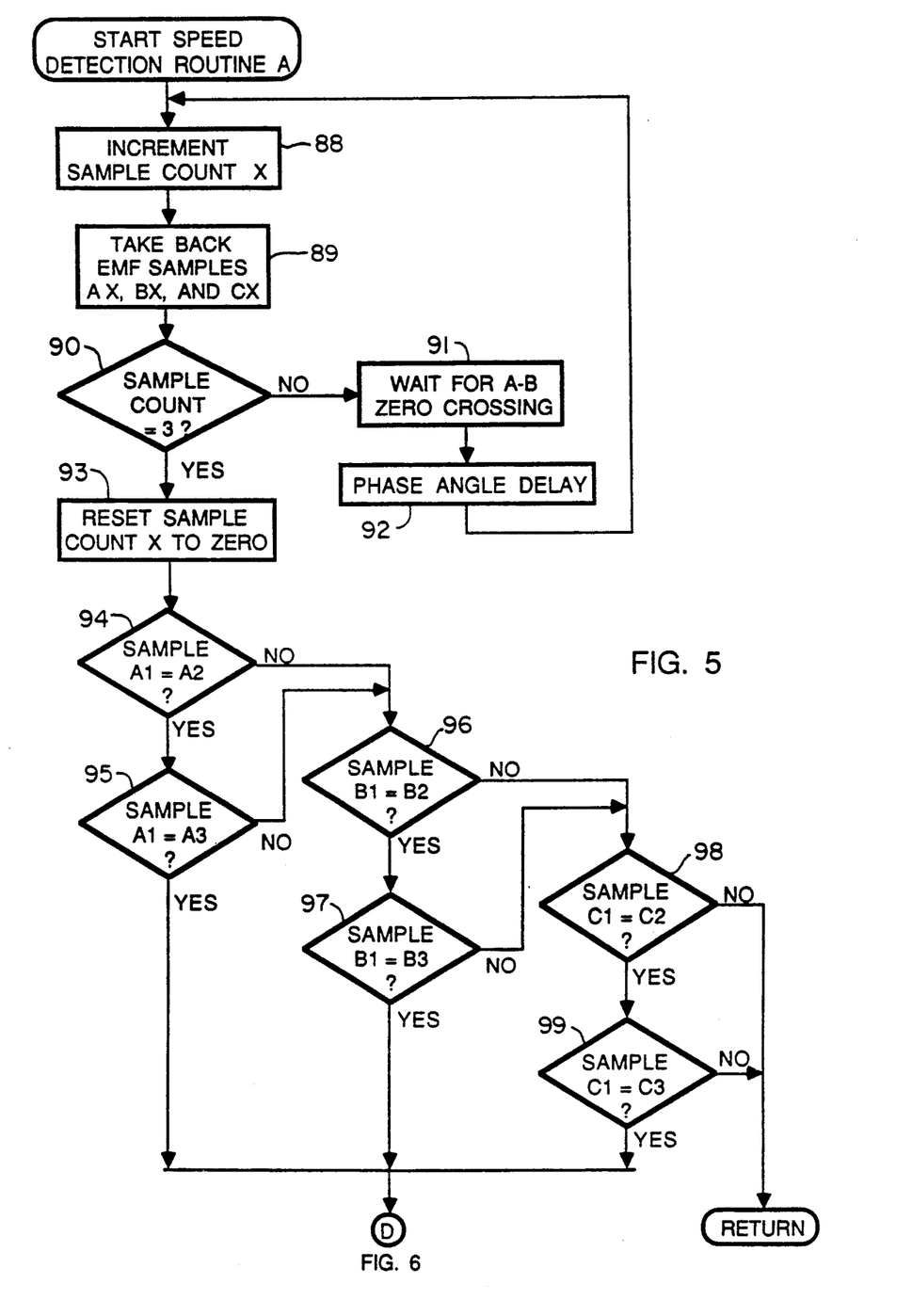
FIG. 5 is a flowchart of a first speed detection software routine to implement the present invention.

After three consecutive zero voltage crossings have occurred in this mode, the microcomputer 30 will have stored three sets of back emf voltage polarity samples and the program execution advances to step 93 on FIG. 5 where the sample count is reset to zero. The remaining portion of the subroutine tests the sets of samples to determine if all three samples from any one of the supply lines have the same polarity, all positive or all negative. This occurs when the motor has slowed to between 50.0 and 37.5 percent of the synchronous speed at the supply line frequency (50 or 60 Hz).

Therefore at step 94 the first two samples A1 and A2 of the back emf voltage polarity from the first stator winding 11 are compared. If the first two samples have the same polarity, the first and third samples A1 and A3 for the first stator winding 11 are compared at step 95. If all three samples have the same polarity the subroutine execution jumps to a continuous SCR firing routine depicted in FIG. 6, as will be described. However, if the polarities of samples A1, A2 and A3 do not match, the program execution branches to steps 96 and 97 where the set of three back emf voltage polarity samples B1, B2 and B3 from the second stator winding 12 are compared. If the polarities of these samples are all the same the execution advances to the continuous SCR firing routine. Otherwise, the set of three back emf voltage polarity samples C1, C2 and C3 from the third stator winding 13 are compared at steps 98 and 99. If these three polarity samples match the software routine continuous SCR firing mode is executed. In the situation where none of the three samples from the same stator winding have identical polarities, the motor speed is not in range from 50 to 37.5 percent of full speed and the program execution returns to step 86 on FIG. 4 to trigger the SCR's to brake the motor further.

Figure 6:
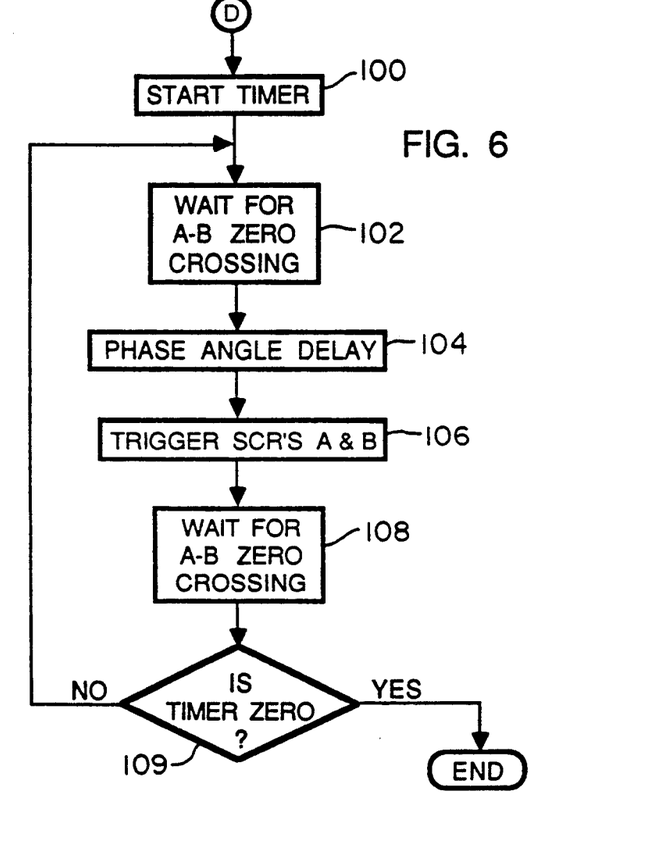
FIG. 6 is a flowchart depicting a routine for another mode of dynamic motor braking.

When the motor speed has slowed to between 50 and 37.5 percent of full speed, the program execution advances to the continuous SCR firing routine depicted in FIG. 6. At step 100, a timer is initialized to control how long this mode of the dynamic braking will have to continue until the motor has stopped. The length of the timer interval is set empirically for the specific motor being controlled. Then at step 102, the microcomputer 30 continuously reads the output from the AB line voltage detector 21 to sense when the line voltage Vab makes a zero crossing. Once that crossing occurs the program execution advances to step 104 where microcomputer execution enters a timed loop that provides a phase angle delay from the zero voltage crossing to when the pairs of SCR's will be triggered. At the desired phase angle, the first and second pairs of SCR's 16 and 17 for supply lines A and B are triggered at step 106.

Then microcomputer 30 waits for another zero crossing of supply line voltage Vab at step 108 so that the SCR's will not be fired during the next half-cycle, but only once during each supply line cycle. When this crossing occurs, the timer is examined at step 109 to determine if the braking program should terminate. If braking is to continue the program execution returns to step 102 to await another zero crossing of voltage Vab. Instead of using a timer to determine when to terminate the braking process, the motor controller 20 could use a motor stoppage detection technique, such as that described in U.S. Pat. No. 4,916,370.

Now consider the motor braking technique that employs cycle skipping to accurately position the object driven by the motor. Initially standard dynamic braking is performed to slow the motor speed to within the range of eighty-four to sixty-four percent of the full synchronous speed at the frequency of the supply line current (50 or 60 Hz). Once the speed has been reduced to this degree, cycle skipping can be used to apply current to the motor at a lower effective frequency without the possibility that the motor 10 will remain synchronized to the frequency of the supply line current.

With reference again to FIG. 4, when this other braking technique is implemented by the microcomputer software, the program execution calls a speed detection routine from step 80 when the motor has slowed below eighty-four percent of full speed. A precursor of this range of speed is given by the dynamic braking process triggering the SCR's once every five cycles of the supply line voltage, as occurs at time $T_1$ on the graph of FIG. 3. At that time, the half-cycle counter has a value less than eleven when it is examined at step 80 (N=11) and the program execution branches to step 82 which calls a different speed detection eubroutine than is used for full dynamic braking.

Figure 7:
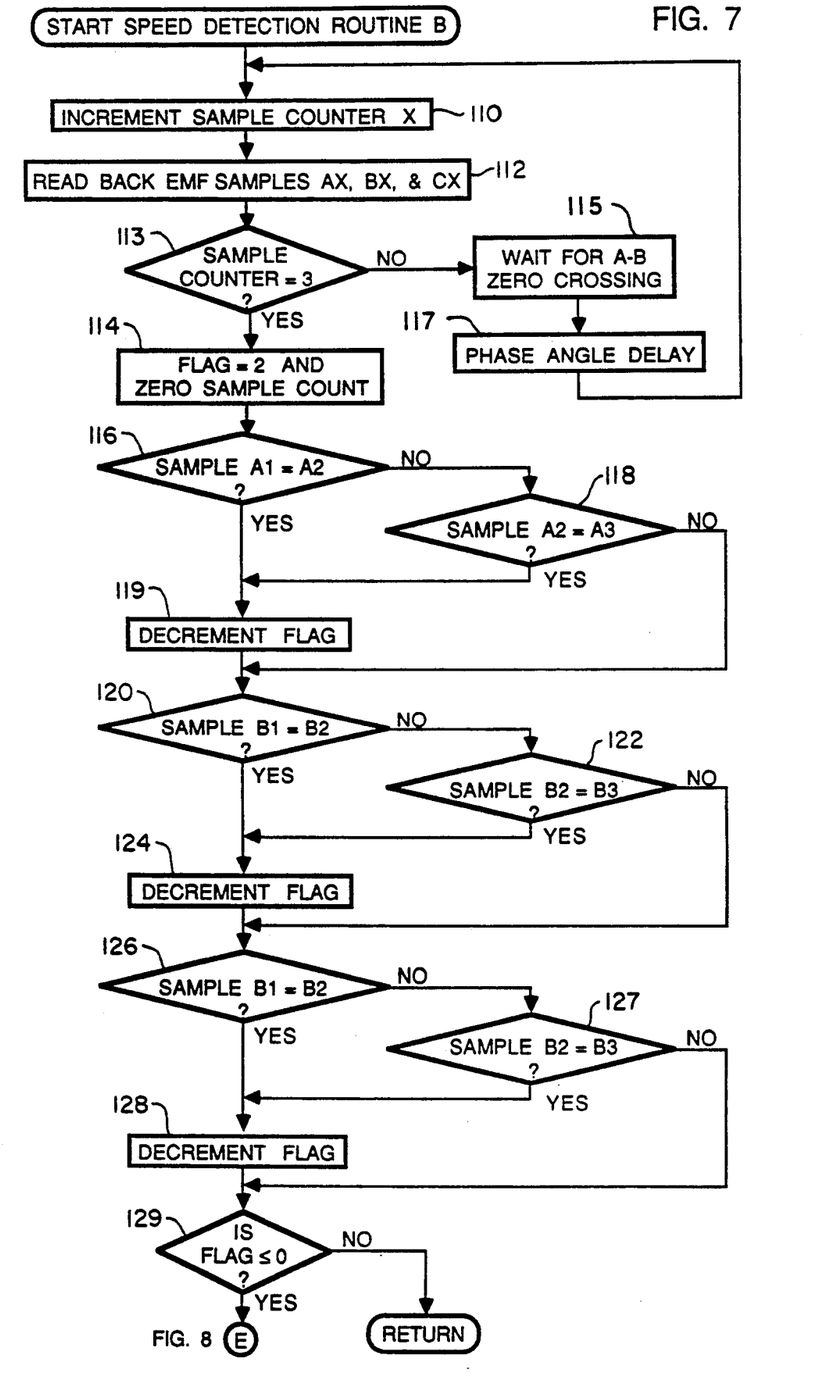
FIG. 7 is a flowchart of a second speed detection software routine to implement the present invention.

With reference to FIG. 7, a speed detection subroutine for cycle skipping operation examines sets of polarity samples of the back emf induced voltage to detect a pattern among those sets which indicates that the motor speed has actually entered the range at which cycle skipping can safely commence. At initial step 110, the microcomputer 30 increments a sample count X in its memory. Then at step 112, the outputs of the three voltage comparators 24–26 are read to obtain a set of polarity samples of the back emf voltage induced in each stator winding 11–13, with the first trio of samples being designated A1, B1 and C1. The sample count is inspected to determine if three of these sets of back emf voltage polarity samples have been taken, at step 113. If not, the program execution branches to step 115 and awaits another zero crossing of the voltage Vab across supply lines A and B. When this voltage crossing occurs, the program waits at step 117 for the phase angle delay before returning to step 110 to acquire another set of back emf voltage polarity samples.

After the occurrence of three consecutive zero crossings of voltage Vab, the microcomputer 30 has stored three sets of back emf voltage polarity samples. Now the program execution advances to a section of the speed detection subroutine in which the sets back emf voltage polarity samples are examined to determine whether the polarity remained the same for two consecutive samples from at least two of the stator windings. This condition exists when the motor 10 has slowed to between eighty-four and sixty-four percent of full synchronous speed at the supply line frequency (50 or 60 Hz).

In this subsequent section of the second speed detection subroutine, the sample counter is reset to zero and a flag is set to two at step 114. Next the microcomputer 30 compares the first pair of consecutive samples A1 and A2 for stator winding 11. If this pair of samples has the same polarity (both positive or both negative), the program execution decrements the flag at step 119 before advancing to step 120 to check the samples from the second stator winding 12. However, if a polarity match is not found between samples A1 and A2, the program branches to step 118 where consecutive samples A2 and A3 are compared by the microcomputer 30. If these samples have the same polarity, the flag is decremented at step 119, otherwise the program advances directly to step 120.

At steps 120 and 122 the microcomputer 30 examines the trio of back emf voltage samples from the second stator winding 12 to determine if any two consecutive samples in this set have the same polarity. If so the flag is decremented at step 124 before advancing to step 126. Similarly, at steps 126 and 127 the three back emf voltage samples from the third stator winding 13 are examined to determine if any two consecutive ones have the same polarity. If so the flag is decremented at step 128 before advancing.

The flag then is tested at step 129 to determine if it has a non-positive value, which exists when two consecutive polarity samples of the back emf induced voltage are found to be the same from at least two of the stator windings 11-13. As noted above, this occurs when the motor speed falls within the range between eighty-four and sixty-four percent of its full synchronous speed. If the samples do not indicate this occurrence, subroutine B returns to step 86 of the main braking program in FIG. 4 to reset the cycle counter and further brake the motor by triggering SCR pairs 16 and 17. When the polarity pattern is found, the program execution advances to a cycle skipping mode.

Figure 9:
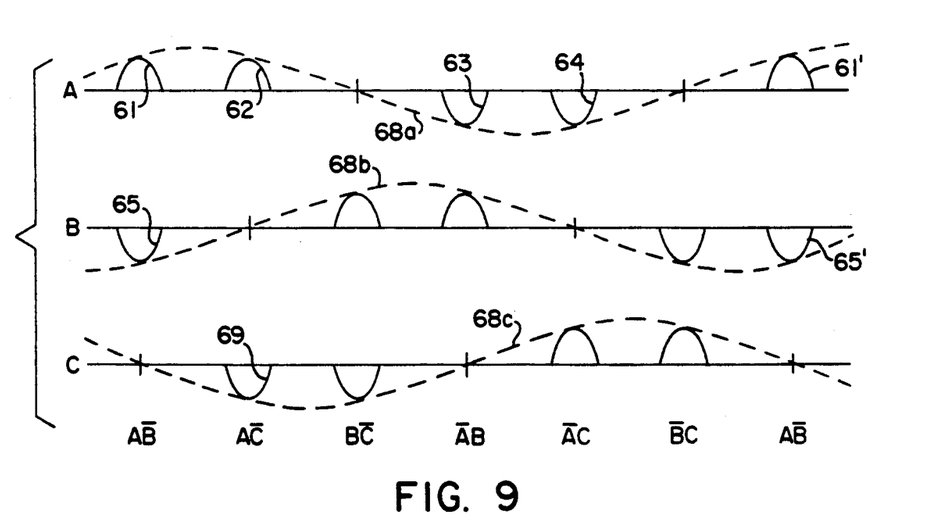
FIG. 9 graphically illustrates the current waveforms at each of the motor terminals during cycle skipping operation of the motor controller.

The software subroutine for the cycle skipping mode commences at time $T_1$ in FIG. 3, at which time dynamic braking ceases. Thereafter, each pair of SCR's 16-18 is selectively triggered in a pattern which effectively applies current to the motor at a fundamental component frequency equal to one-seventh the frequency of the supply line current. Exemplary patterns of this triggering are shown in the waveforms of FIG. 9. With respect to waveform A, the first pair of SCR's 16 is initially triggered to produce two positive current pulses 61 and 62 at motor terminal 41. Following pulse 62, the first pair of SCR's 16 is not triggered at all during the next full cycle of the electricity from the A supply line. After this hiatus in triggering the SCR's for supply line A, the SCR's are triggered to produce two negative current pulses 63 and 64 at motor terminal 41. Following pulse 64 another one cycle hiatus occurs in triggering the first SCR pair 16. Thereafter, this pattern repeats as long as the motor controller 20 is in the cycle skipping mode. The other two SCR pairs 17 and 18 for supply lines B and C are triggered in identical patterns, but 120 electrical degrees out of phase.

As is apparent by comparing the three waveforms in FIG. 9, when the current pulse 61 flows through motor terminal 41 for line A, a negative current 65 flows through motor terminal 42 for line B, as indicated beneath waveforms by the designation $A\overline{B}$. Then when the current pulse 62 flows through motor terminal 41, a negative current 65 flows through motor terminal 43, as indicated beneath waveforms by the designation AC. The pattern of current pulses in the three motor windings comprise six intervals in which different combinations of two SCR pairs are triggered to send current through the motor. Each of these six intervals is 420 electrical degrees in duration.

These triggering patterns produce three effective current waveforms 68a, 68b and 68c through the stator windings 11, 12, and 13 respectively. The effective frequency of the resultant current is one-seventh the frequency of the alternating supply line current. The application of this frequency component of the supply line current produces a further reduction in the speed of the motor until at time $T_3$ in FIG. 3, the motor 10 synchronizes with this frequency component and its speed becomes constant.

Although the present invention is being described in terms of a technique which employs a one-seventh fundamental frequency component, other fundamental frequency components can be used. Such frequencies are determined by the expression $f/(6n+1)$ where f is the frequency of the supply line current and n is a positive integer. In a technique for bringing the motor to a controlled stop, the 1/7 and 1/13 fundamental frequency components are preferred as lower frequencies drive the motor at speeds too slow for most practical applications. In generating the 1/13 fractional frequency, the SCR's for each supply line are triggered during four consecutive positive half cycles of the supply current, then not triggered for two cycles, triggered for four consecutive negative half cycles, followed by another two cycle non-trigger interval. This pattern then repeats until the motor has moved the driven device to the desired position at time $T_4$.

Figure 8:
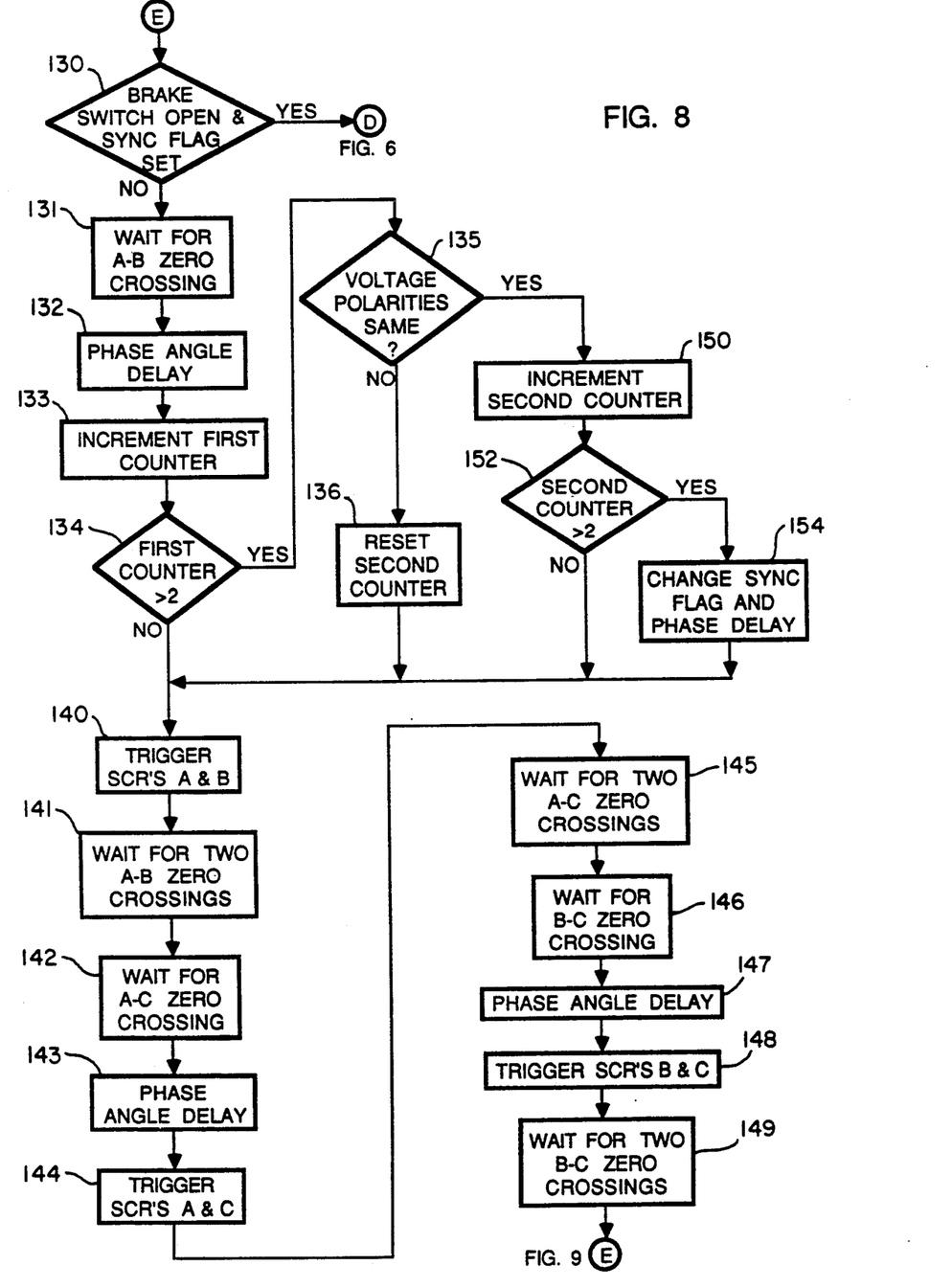
FIG. 8 is a flowchart of a cycle skipping motor speed control program.

The cycle skipping software subroutine for microcomputer 30 is depicted in FIG. 8 and commences at step 130, where a flag is inspected which indicated when the motor has become synchronized with the fundamental frequency component. When this portion of the program is first executed at time $T_1$, the motor will not be synchronized and the program will advance to step 131, to await a zero crossing of the voltage Vab across supply lines A and B. When this voltage crossing occurs, the microcomputer 30 enters a timed loop at step 132, that provides a phase angle delay between the zero crossing of the supply line voltage Vab and the triggering of the SCR's. After this delay interval has elapsed a first counter is incremented at step 133, and the resultant value is tested at step 134 to determine if it is greater than two. The first counter provides an inhibiting mechanism for the portion of the program that whether the motor has synchronized to the fundamental frequency component (as occurs at time $T_3$). The testing is inhibited for one cycle of the fundamental frequency component when cycle-skipping commences at time $T_1$, so that voltage transients in the back emf can not produce an erroneous determination that the motor has become synchronized to the lower frequency. Therefore, for two voltage crossings of the fundamental frequency component applied to winding 11 of the motor (two passes through the program loop on FIG. 8), this motor synchronization detection is inhibited and the program execution advances directly to step 140.

At this time, SCR pairs 16 and 17 for supply lines A and B are triggered at step 140 by the microcomputer issuing output pulses over output lines 27 and 28. This produces the current pulses 61 and 65 depicted on FIG. 9, which result in a positive current flow through the first winding 11 of the motor and a negative current flow through the second winding 12, a indicated by current Iab in FIG. 1).

After the SCR's for the supply lines A and B have been triggered, the microcomputer 30 waits for two zero crossings of the supply line voltage Vab at step 141 to provide a delay of 360 degrees of that voltage. This delay period is provided by the microcomputer 30, monitoring the input line from the AB line voltage detector 21. After the second zero voltage crossing, the program execution waits for a zero crossing signal from the AC line voltage detector 23 for supply line voltage Vac at step 142. This zero crossing occurs 420 electrical degrees from the zero crossing which produced the previous triggering of the SCR pairs 16 and 17. Upon detection of the zero crossing in the voltage Vac, the microcomputer 30 times the phase delay at step 143 before triggering SCR pairs 16 and 18 for supply lines A and C at step 144. This triggering of the first and third SCR pairs 16 and 18 produces the current pulses 62 and 69 shown in FIG. 9, which cause a positive current to flow through the first winding 11 of the motor and a negative current to flow through its third winding 13, as designated by the legend $A\overline{C}$.

The program execution then waits for two more zero crossings of voltage Vac across supply lines A and C to provide another 360 degree delay. After this delay at step 145, the program advances to step 146, where the microcomputer 30 begins sensing the output from the BC line voltage detector 22 to determine when the next zero crossing occurs in the supply voltage Vbc. Upon the occurrence of that zero crossing and after a phase delay at step 147, the SCR pairs 17 and 18 for supply lines B and C are triggered at step 147. Thereafter the program execution waits for two consecutive zero crossings of the voltage Vbc at step 149 before returning to step 130 to repeat the process.

Each pass through the motor control program loop on FIG. 8 triggers the SCR pairs 16–18 to produce one half-cycle of the fundamental frequency component 68a, 68b and 68c at each motor terminal 41, 42 and 43. On the subsequent pass through the program loop, the opposite polarity half-cycle of a component of the fundamental frequency is generated.

As noted above, during the first two passes through the loop of the motor control program flowcharted on FIG. 8, the program execution advances directly from step 134 to step 140 bypassing the portion which detects when at time $T_3$ the motor becomes synchronized to the generated component frequency of the supply line frequency. After the first cycle of this component frequency has been generated, the first counter will have a value greater than two. Thereafter, just prior to triggering the SCR's in module 14 to produce the first of the pair of positive or negative current pulses in the A supply line (e.g. pulses 61' and 65'), a test is made to determine whether the motor 10 has become synchronized to this lower frequency. This test is accomplished by comparing the polarity of the supply line voltage Vab to the voltage induced in the first winding 11 of the motor 10 by the back emf when supply current is not flowing through that winding.

Therefore, when the first counter has a value greater than two, the program branches from step 134 to step 135 to read the input from the first voltage comparator 24, which indicates the polarity of the back emf induced in the first motor winding 11. At the same time, the output from the AB line voltage detector 21 is examined to determine whether the polarity of the supply line voltage Vab is positive or negative. As the motor 10 is slowing in speed from time $T_1$, it is in a regenerating mode with the speed being higher than the synchronous speed of the motor for the component frequency being applied to the motor. In this mode, the back emf voltage leads the applied current by greater than 90 degrees, but less than 180 degrees. Therefore, the back emf voltage will be opposite in polarity to the polarity of the supply line voltage Vab as referenced to the neutral node 15 of the motor 10. Prior to time $T_3$, these polarities will not be the same and a second counter is reset to zero at step 136 before the program execution advances to step 140 to continue the SCR triggering pattern.

At time $T_3$ in FIG. 3, the motor 10 becomes synchronized to the component frequency of the supply line current and the back emf voltage leads the current by less than ninety degrees, thereby having the same polarity as the supply line voltage Vab at step 135. At this point, the program execution branches to step 150, where the second counter is incremented and then tested at step 152 to determine if the count is greater than two. The second counter provides another delay of one cycle of the component frequency before reaching a determination that the motor has become synchronized with that lower frequency. This delay prevents a transient voltage level from producing a false determination that the motor is synchronized.

If the back emf and supply line voltage polarities remain the same for one cycle of the component frequency, the program branches to step 154, where the sync flag is set to indicate the synchronization of the motor speed. The phase angle delay for triggering the SCR's may also be changed at this step. For example, if less torque is required to drive the motor at a constant speed after time $T_3$ than was required to produce the speed reduction between times $T_1$ and $T_3$, the phase angle delay is increased to produce a lower positive torque in the motor. Alternatively, instead of altering the triggering phase angle, the controller can shift the cycle skipping to produce an even slower speed by generating a lower component frequency.

After the motor 10 becomes synchronized to the component frequency of the supply line frequency, the program continues looping through the portion depicted on FIG. 8 until pushbutton 52 is opened at time $T_4$. The opening of pushbutton 52 is detected at step 130. If at that time the sync mode flag also is set, the execution of the program by microprocessor 30 branches to the continuous mode of dynamic braking depicted by the flowchart of FIG. 6. If the pushbutton 52 opens before the motor speed becomes synchronized to the lower frequency (before the sync flag is set), the program does not branch out of the cycle skipping mode. However, if pushbutton 52 remains open, the program will branch from the cycle skipping mode to the continuous dynamic braking mode the next time step 130 is executed after the sync flag is set at step 154.

The continuous mode of dynamic braking has been described previously and sends current through the first and second windings 11 and 12 of the motor during every positive or every negative half-cycle of the alternating voltage Vab across supply lines A and B. At this point in time, the motor 10 has slowed significantly so that such application of electricity rapidly reduces the speed the the motor to a stop. When dynamic braking is used after cycle skipping the continuous mode lasts for a very short interval as set by the timer at step 100.

I claim:

1. An apparatus for controlling an induction motor, that is supplied by a source of three-phase electricity the voltage of which alternates in polarity at a given frequency, said apparatus comprising:
   three bidirectional switch means, each coupling a different phase of the source to a different one of three windings in the motor;
   means for sensing polarity of back emf voltage induced across each winding in the motor to produce a separate polarity sample for each winding during each one of a plurality of consecutive half-cycles of the voltage from one phase of the source;
   means for detecting a predefined relationship among the polarity samples, which predefined relationship occurs when the motor has a speed within a given range, and producing an indication when the predefined relationship exists; and
   a means, responsive to the indication, for controlling said bidirectional switch means to apply a first sequence of current pulses to the motor when the speed is greater than the given range, and to apply a second sequence of current pulses to the motor when the speed is within the given range.

2. The apparatus as recited in claim 1 further comprising a second means for sensing the polarity of the voltage of the source.

3. The apparatus as recited in claim 2 wherein said means for controlling produces the first sequence of current pulses by applying current from the source to the motor in response to the polarity of the voltage of the source being opposite to the polarity of the back emf voltage.

4. The apparatus as recited in claim 3 wherein said means for controlling applies the second sequence of current pulses by applying electricity from the source to the motor during every other half-cycle of current from the source.

5. The apparatus as recited in claim 4 wherein the predetermined relationship exists when three consecutive polarity samples from one of the windings have the same polarity.

6. The apparatus as recited in claim 3 wherein the application of the second sequence of current pulses sends current through the motor at an effective frequency that is a fraction of the given frequency.

7. The apparatus as recited in claim 6 wherein:
   said means for sensing polarity of back emf voltage produces a polarity sample during each of three consecutive half-cycles, thereby producing a set of three polarity samples for each winding; and
   the predetermined relationship occurs when two consecutively produced polarity samples in one set have the same polarity and two consecutively produced polarity samples in another set have identical polarities.

8. The apparatus as recited in claim 1 wherein said means for controlling applies the second sequence of current pulses by applying electricity from the source to the motor during every cycle of the electricity from the source.

9. The apparatus as recited in claim 1 wherein the application of the second sequence of current pulses applies current through the motor at an effective frequency that is a fraction of given frequency.

10. An apparatus for controlling an induction motor, which is supplied by a source of three-phase electricity having a voltage alternating in polarity at a first frequency, said apparatus comprising:
    three bidirectional thyristor switch means, each coupling a phase of the source to one of three windings of the motor;
    means for generating a control signal;
    means for producing, during each of a plurality of consecutive half-cycles of the voltage from one phase of the source, indicia of the polarity of back emf voltage induced in each winding of the motor;
    means, coupled to said means for producing, for storing a plurality of polarity indicia for each winding of the motor;
    a sensing means for determining polarity of the voltage from the source;
    means, responsive to said means for producing and said sensing means, for detecting when the voltage from the source and the back emf voltage have opposite polarities;
    means for comparing the stored indicia to detect a predetermined relationship among a plurality of polarity indicia for each winding;
    a means for operating said thyristor switch means in a first mode in which current is sent through the motor during every half-cycle of current from each phase of the source, in a second mode commencing in response to the control signal in which said thyristor switch means are operated to send current through the motor in response to detection of the voltage from the source and the back emf voltage having opposite polarities, and in a third mode commencing upon detection of the predetermined relationship in which said thyrsitor switch means are controlled to sent current through the motor at an effective second frequency that is less than the first frequency.

11. The apparatus as recited in claim 11 wherein said means for comparing examines sets of three polarity indicia from each winding of the motor, and the predefined relationship exists when two consecutive indicia in one set have the same polarity and two consecutive indicia in another set have identical polarities.

12. An apparatus for controlling an induction motor, which is supplied by a source of three-phase electricity having a voltage that alternates in polarity, said apparatus comprising:
    three bidirectional thyristor switch means, each coupling a different phase of the source to one of three windings in the motor;
    means for generating a control signal;
    means for producing, during each of a plurality of consecutive half-cycles of the voltage from one phase of the source, an indicia of the polarity of back emf voltage induced in each winding of the motor;
    means, coupled to said means for producing, for storing a plurality of polarity indicia for each winding of the motor;

a sensing means for determining polarity of the voltage from the source;

means, responsive to said means for producing and said sensing means, for detecting when the voltage from the source and the back emf voltage have opposite polarities;

means for comparing the stored indicia to detect a predetermined relationship among a plurality of polarity indicia for each winding;

a means for operating said thyristor switch means in a first mode in which current is sent through the motor during every half-cycle of current from each phase of the source, in a second mode commencing in response to the control signal in which said thyristor switch means are operated to send current through the motor in response to detection of the voltage from the source and the back emf voltage having opposite polarities, and in a third mode commencing upon detection of the predefined relationship in which said thyristor switch means are controlled to send a current pulse through a winding of the motor during every other half-cycle of current in one phase of the source.

13. The apparatus as recited in claim 12 wherein said means for comparing examines sets of three polarity indicia from each winding of the motor, and the predefined relationship exists when all three consecutive indicia in one of the sets have the same polarity.

14. A method for controlling an induction motor, that is connected by a switch means to a source of three-phase electricity having a voltage which alternates in polarity, the method comprising the steps of:

sensing polarity of back emf voltage induced across each winding in the motor during consecutive half-cycles of the voltage from one phase of the source to produce a set of polarity samples for each winding;

comparing the polarity samples in each set to detect a predetermined relationship among the samples, which occurs when the motor has a speed within a given range; and altering the operation of the switch means to apply different sequences of current pulses to the motor in response to whether the predefined relationship has been detected.

15. The method as recited in claim 14 wherein said comparing step detects that the predefined relationship exists when three consecutive polarity samples in any one set have the same polarity.

16. The method as recited in claim 14 wherein said comparing step detects that the predefined relationship exists when two consecutive samples in one set have the same polarity and two consecutive samples in another set have identical polarities.

* * * * *